(12) United States Patent
Pechnik

(10) Patent No.: US 8,906,493 B2
(45) Date of Patent: Dec. 9, 2014

(54) STRUCTURAL COMPOSITE PANEL FOR AN AIRCRAFT INCLUDING A PROTECTION AGAINST HIGH ENERGY IMPACTS

(75) Inventor: Nicolas Pechnik, Paris (FR)

(73) Assignee: Airbus Operations (S.A.S.), Toulouse (FR)

( * ) Notice: Subject to any disclaimer, the term of this patent is extended or adjusted under 35 U.S.C. 154(b) by 1108 days.

(21) Appl. No.: 12/934,755

(22) PCT Filed: Mar. 26, 2009

(86) PCT No.: PCT/FR2009/000333
§ 371 (c)(1),
(2), (4) Date: Sep. 19, 2011

(87) PCT Pub. No.: WO2009/133257
PCT Pub. Date: Nov. 5, 2009

(65) Prior Publication Data
US 2012/0040159 A1    Feb. 16, 2012

(30) Foreign Application Priority Data

Mar. 28, 2008  (FR) ...................................... 08 01686

(51) Int. Cl.
*B32B 7/02*    (2006.01)
*B32B 5/02*    (2006.01)
(Continued)

(52) U.S. Cl.
CPC ............... *B29C 70/086* (2013.01); *B29C 65/48* (2013.01); *B29C 66/45* (2013.01); *B29C 66/721* (2013.01); *B29C 66/7352* (2013.01); *B29K 2011/00* (2013.01); *B29K 2063/00* (2013.01); *B29K 2307/00* (2013.01); *B29K 2995/0089* (2013.01); *B29L 2009/00* (2013.01); *B29L 2031/3091* (2013.01); *B29L 2031/721* (2013.01); *Y02T 50/433* (2013.01); *Y02T 50/43* (2013.01); *B29C 65/483* (2013.01)
USPC ............................................ 428/213; 156/60

(58) Field of Classification Search
CPC ........ B32B 27/32; B32B 27/08; B32B 15/08; B32B 27/00; C08L 23/0815; C04B 35/83; B60C 23/0493; B65C 9/265; B29C 70/08
USPC ............................................ 428/213; 156/60
See application file for complete search history.

(56) References Cited

U.S. PATENT DOCUMENTS 3,472,730 A     10/1969  Frigstad
3,525,703 A  *   8/1970  Honda et al. ................... 523/408
(Continued)

FOREIGN PATENT DOCUMENTS

AU       565384 B2      9/1987
GB      1011262    *   11/1965
(Continued)

OTHER PUBLICATIONS

International Search Report, dated Nov. 30, 2009, from corresponding PCT application.

*Primary Examiner* — Aaron Austin
*Assistant Examiner* — Tahseen N Khan
(74) *Attorney, Agent, or Firm* — Young & Thompson

(57) ABSTRACT

A structural panel consisting of a stratified composite material includes one face exposed to impacts and further includes a layer consisting of a hyper-elastic material bonded adhesively to its other face. According to this embodiment, debris striking the exposed face of this composite panel will have some of its energy dissipated by the local rupture of the composite skin, while the rest of the energy is absorbed by the deformation of the layer of hyper-elastic material that captures the debris and expels it again.

4 Claims, 2 Drawing Sheets

(51) Int. Cl.
*B32B 27/38* (2006.01)
*B32B 25/16* (2006.01)
*B32B 37/14* (2006.01)
*B32B 37/12* (2006.01)
*B29C 70/08* (2006.01)
*B29C 65/48* (2006.01)
*B29C 65/00* (2006.01)
*B29K 63/00* (2006.01)
*B29K 307/00* (2006.01)
*B29L 9/00* (2006.01)
*B29L 31/30* (2006.01)
*B29L 31/00* (2006.01)

(56) References Cited

U.S. PATENT DOCUMENTS

| | | | |
|---|---|---|---|
| 3,616,185 | A | 10/1971 | Goldberg |
| 5,028,056 | A | 7/1991 | Bemis et al. |
| 2004/0247882 | A1* | 12/2004 | Kouchi et al. ............ 428/413 |
| 2007/0095982 | A1* | 5/2007 | Kismarton et al. ......... 244/119 |

FOREIGN PATENT DOCUMENTS

| | | |
|---|---|---|
| JP | 2001310798 A | 11/2001 |
| WO | 2006070014 A1 | 7/2006 |
| WO | 2006105904 A1 | 10/2006 |
| WO | 2007095982 A1 | 8/2007 |

\* cited by examiner

STRUCTURAL COMPOSITE PANEL FOR AN AIRCRAFT INCLUDING A PROTECTION AGAINST HIGH ENERGY IMPACTS

CROSS-REFERENCE TO RELATED APPLICATIONS

N/A

BACKGROUND OF THE INVENTION

1. Field of the Invention

This invention relates to structural panels made of laminated composite material used for the construction of aircraft fuselages. More specifically, the invention relates to a structural aircraft panel subjected to high-energy impacts, the special structure of which can prevent the impacting projectile intruding beyond a predetermined distance inside the fuselage.

2. Description of the Related Art

It is known that the use of composite materials enables lighter structures to be produced for the same mechanical performance. This is especially advantageous in the case of aircraft structures.

In many cases, low- or medium-thickness composite structures, such as the skin of an aircraft fuselage, nacelle panels or the panels of the landing gear housing, do not permit high incident energy or high-speed projectiles to be contained.

Unlike metallic materials, which can dissipate the energy through plastic deformation, composite materials have a brittle behavior under impact, which means that the material's absorbent potential cannot be used in a resilient way. Therefore it is traditionally recommended to significantly thicken the laminate so as to avoid rupture in the areas where the structure must protect vital aircraft systems.

However, in most cases, this solution leads to other problems:
  Introduction of local rigidity gradients: the interruption of layers can cause harmful delamination (separation of layers) under impact and particularities may appear during dimensioning under static loads and fatigue.
  Introduction of too great a thickness, causing transverse traction effects through wave reflection, resulting in delamination that can propagate.
  More complex manufacturing: handling the extra thicknesses requires changes in the production cycle.
  Increased mass On the other hand, solutions for protection by shielding (combining several absorbent or resistant materials in a laminate) as a secondary structure, as disclosed in international patent application WO 2006/070014, are disadvantageous in several respects:
  The addition of an additional mass, non-stress-bearing with regard to operational stresses
    Durability of the shielding elements in the environmental conditions experienced by the aircraft
    Changes to the manufacturing process and the inspection and maintenance procedures.

There is therefore a need for a structural aircraft panel incorporating protection against high-energy impacts.

However the only deformation mechanisms able to dissipate energy in composite materials are damage modes.

Patent application U.S. 2007/095982 describes a structural aircraft panel formed from a composite material with fiber reinforcement and able to withstand impacts such as collisions with birds. In this case the skin is made of a composite material specially optimized to withstand shocks and not break during these impacts but instead deform and deflect the trajectory of the impacting body. This solution is effective in cases of impact with a projectile such as a bird, which behaves like a viscous fluid and whose impact energy is distributed over a large area of the panel. The solution is not effective against impacts with debris that generally impacts over a small area.

SUMMARY OF THE INVENTION

In order to solve the inconveniences noted in the prior art, the invention proposes a structural panel formed from a stratified composite material and comprising one face exposed to impacts and further comprising a layer comprising a hyper-elastic material bonded adhesively to its other face. According to this embodiment, debris striking the exposed face of this composite panel will have some of its energy dissipated by the local rupture of the composite skin, the rest of the energy being absorbed by the deformation of the layer of hyper-elastic material that captures the debris and expels it again. Thanks to the layer of hyper-elastic material, the composite material's dissipation capacity can be exploited to its maximum.

As the layer of hyper-elastic material is located in an inner area, i.e. inside the fuselage, access to and controllability of the health of the primary structure during the aircraft's lifespan are maintained. Secondly, the layer of hyper-elastic material is protected from the external environment and physico-chemical aggressions such as exposure to radiation, bad weather and chemical agents for cleaning, de-icing etc.

According to this embodiment, the structural panel comprises a skin made of composite with fiber reinforcement in the form of continuous carbon fibers in an epoxy matrix. This type of material has optimal characteristics of structural resistance against operational stresses such as static mechanical stresses or fatigue, thus enabling significant mass savings on the aircraft's primary structure, compared to a metallic primary structure. However this material does not present a significant capability for plastic deformation able to dissipate the energy of an impact and prevent a projectile penetrating by its own deformation. The addition of a layer of hyper-elastic material allows such a panel to be dimensioned with respect to operational stresses only, the layer of hyper-elastic material ensuring that the projectile does not penetrate into the fuselage where it might damage systems.

The structural panels utilized according to this embodiment are especially suitable for forming fuselage structures in aircraft areas where it is necessary for systems to be protected by the primary structure made of composite material and where an analysis of said primary panel's damage tolerance makes it possible to demonstrate the feasibility of the airplane's return flight after damage. In effect, a structural panel according to the invention dissipates some of the impact through damage to and multiple ruptures of the composite layers.

The primary structural panels concerned have a 2 mm to 4 mm thickness of carbon—epoxy resin composite for a continuous fiber volume ratio greater than or equal to 50%. Such a panel has a density of 1500 kg/m$^3$. The thickness of the layer of hyper-elastic material is equal to or less than the thickness of skin made of composite material. The typical density of hyper-elastic materials with rubber behavior is 1000 Kg/m$^3$. Consequently protection according to the invention of the aircraft's internal systems against a projectile's penetration into the fuselage is obtained with the utilization of a mass of material that is less than with the solution of the prior state of the art, consisting of dimensioning the composite material's thickness such that the impact cannot cause its rupture.

In the frequent case where the structural panel is a panel stiffened by profiles bonded onto said panel by any means known to the person skilled in the art, such as co-curing, gluing or riveting, the layer of hyper-elastic material is simply bonded between the stiffeners.

According to an advantageous embodiment, the layer of hyper-elastic material is formed from a polychloroprene elastomer such as NEOPRENE® distributed by DuPont Chemicals. This material presents hyper-elastic elongation capabilities of about 500% and is able to withstand operating conditions that entail, in the areas in question, temperature variations ranging from −55° C. to +70° C. under humid conditions, depending on the phases of flight, and also chemical aggressions by such products as hydraulic oil or fuel.

The layer of hyper-elastic material is preferably bonded adhesively. Although direct vulcanization is possible on the relevant surface of the structural panel made of composite material, this solution involves changing the method of realizing the panels and handling heavier panels during assembly, itself made more complex because of the presence of the layer of hyper-elastic material. It is therefore preferable to bond the layer of hyper-elastic material after assembly. Said gluing must be strong so that the penetration of the projectile or debris mainly causes a local hyper-elastic deformation of the layer of rubber material and not a "peeling" of this layer by the glue rupturing along the composite skin—hyper-elastic material layer interface. The gluing must also withstand the same environmental conditions as the layer of hyper-elastic material. An epoxy type of adhesive meets these requirements.

According to an advantageous method for implementing the invention, an aircraft fuselage's structural element exposed to the impacts is manufactured according to steps consisting of:
- manufacturing skin panels made of composite material
- assembling said panels to form the fuselage element
- bonding the layer of hyper-elastic material on the inner surfaces of panels exposed to impacts after assembly.

When the structural panel is a stiffened panel, this manufacturing method also incorporates a step of fitting and fixing stiffeners on the skin after the first step.

Thus the implementation of the protective layer is local and is not part of the primary structure's manufacturing method, and the assembly procedures are not changed.

Advantageously, a composite structural panel according to the invention makes it possible to exploit the damage by rupture of the skin made of laminate composite material, which is a major source of energy dissipation. In the prior state of the art such a skin made of laminated composite material would be dimensioned to not break under the effect of the impact as it alone ensured non-penetration of the projectile.

As a non-limiting example, a landing gear housing covering made of carbon-epoxy resin composite material, which, according to the prior state of the art, would require a thickness of 6.5 mm so as to withstand the impact of tire debris, can be produced according to the invention with a thickness of 3.25 mm, corresponding to the thickness required to absorb operational stresses, associated with a 3 mm layer of a chloropolymer type of hyper-elastic material, a weight saving of about 20%.

BRIEF DESCRIPTION OF THE DRAWING FIGURES

DETAILED DESCRIPTION OF THE INVENTION

Figure 1:
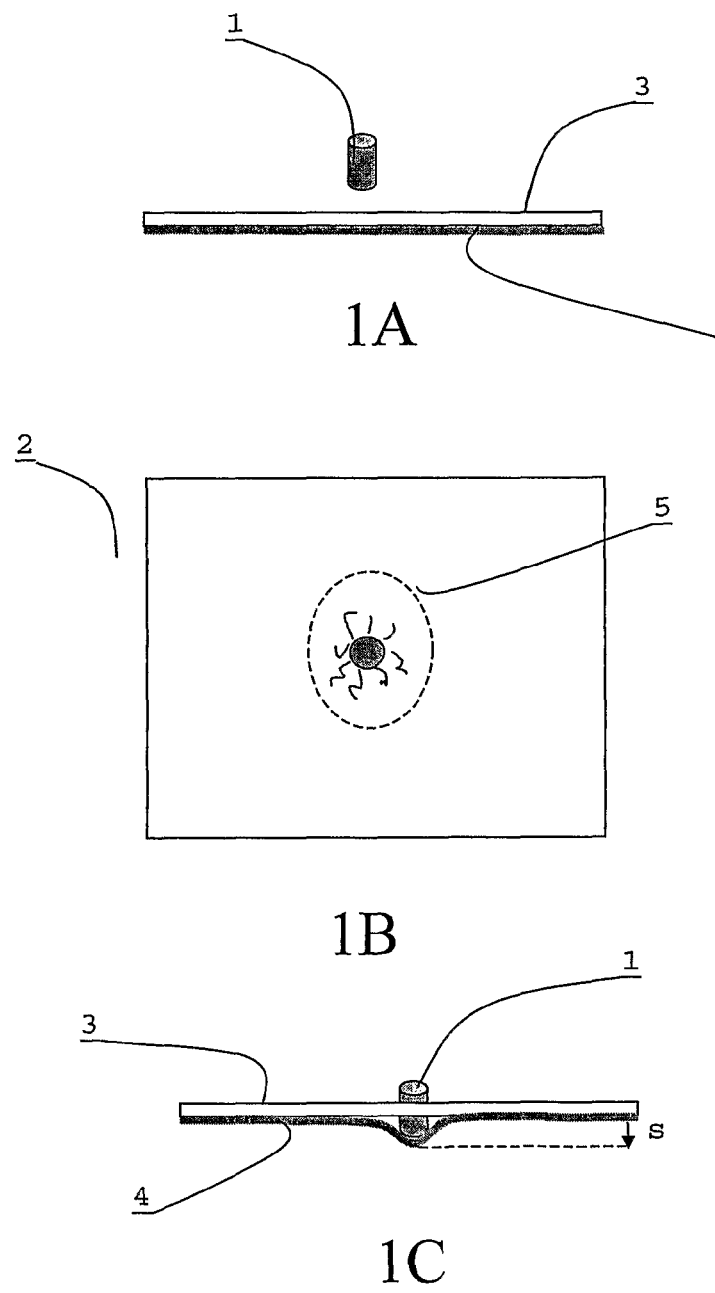
FIG. 1 represents schematically the different phases (FIGS. 1A, 1B, 1C) of the impact of a projectile on the outer surface of a structural panel according to the invention.

FIG. 1A, a projectile (1) is about to impact on the composite panel according to the invention (2) on the side of the skin made of composite material (3). This type of projectile (1) can comprise:
- debris such as tire debris whose behavior is flexible, i.e. the projectile is likely to deform elastically under the effect of the impact, and arrive on the structure with an incident energy of about 4000 joules. This type of debris generates what is referred to as local structural stress, the surface area of the impact being approximately equal to the largest surface area of the un-deformed debris
- small debris coming from engines. This type of debris has a very inflexible behavior and generates a very local structural stress, the impact area being approximately equal to the surface area of the contact between the projectile and the panel. The incident energy ranges between 1000 and 4000 joules
- a bird, the behavior of this projectile is comparable to that of a viscous fluid. At the time of the impact it will "flow" over the structure, thus generating a distributed force. The incident energy is about 30000 joules FIG. 1B, when the projectile (1) meets the composite skin (3), a significant portion of the incident energy is dissipated by the material's damage and rupture mechanisms over an area affected by the impact (5). These modes of damage (delamination, fiber breakage, vaporization of the resin and others) dissipate much of the incident energy and slow the projectile down.

FIG. 1C, the projectile crosses through the composite skin and meets the layer of hyper-elastic material (4) which, thanks to its hyper-elastic deformation capability, absorbs the projectile's remaining kinetic energy without breaking, and then expels it again. The thickness of the layer of hyper-elastic material is chosen so that, for a projectile with given characteristics, the projectile's distance of penetration remains below a threshold (s) thus ensuring that there is no damage to systems located behind the structural panel.

Figure 2:
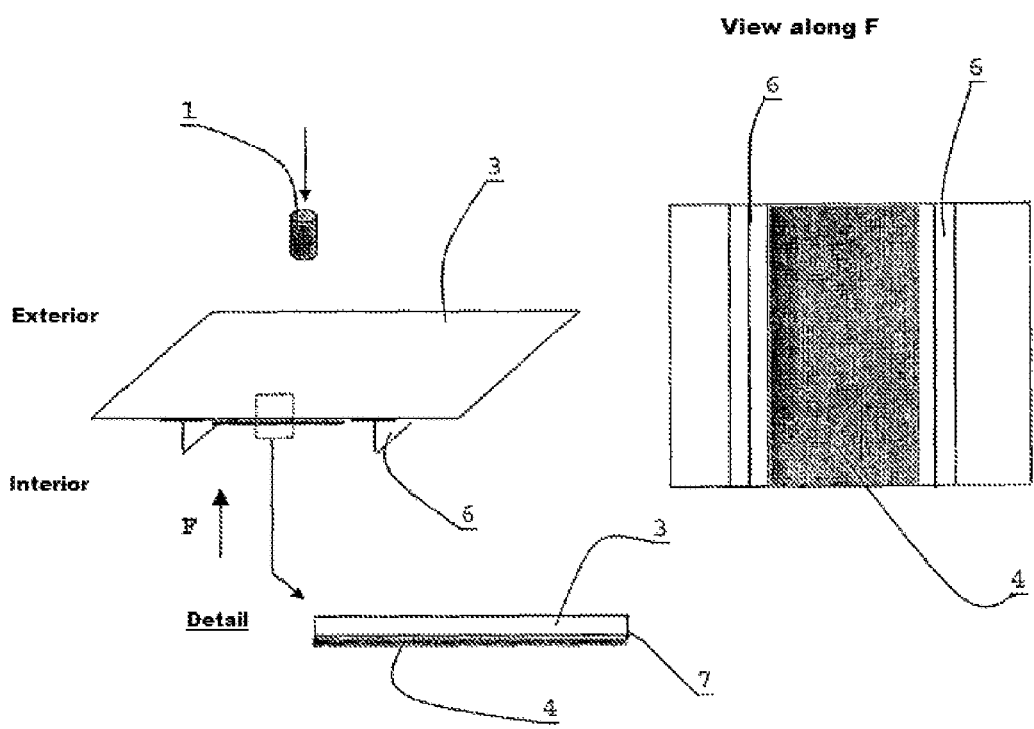
FIG. 2 represents schematically the structural characteristics of a panel according to the invention comprising stiffeners.

FIG. 2, in most cases the structural panels comprise stiffeners (6) bonded on the inner surface of the skin. In this case the layer of hyper-elastic material (4) is simply bonded adhesively (7) between said stiffeners after the structural panels are assembled.

The invention claimed is:

1. A structural panel, comprising:
- a 2-4 mm thick composite skin with fiber reinforcement formed from continuous fibers, the composite skin is a carbon-epoxy resin composite with a continuous fiber volume ratio of greater or equal to 50%, one surface of said skin being exposed to impacts;
- a layer formed from a hyper-elastic material formed from a chloroprene elastomer with a thickness equal to or less than the thickness of said composite skin and bonded adhesively with epoxy glue to a first surface of the composite skin, the hyper-elastic material having elongation capabilities of about 500%; and
- stiffeners where the layer of hyper-elastic material is bonded to the skin between said stiffeners,
- wherein the structural panel is resistant to operational static and fatigue stresses imposed on a second surface of the composite skin opposite the first surface, and debris striking the second surface with an incident energy of 1000 to 4000 joules will have energy dissipated by local rupture of the composite skin and no peeling off of the layer of hyper-elastic material by glue rupturing along the composite skin, and the panel is configured such that some energy of the debris is dissipated by local rupture of the composite skin, and energy absorbed by deformation of the layer of hyper-elastic material expels the debris.

2. A method for manufacturing a structural element exposed to impacts of an aircraft fuselage according to claim 1, comprising:

manufacturing skin panels made of composite material;
assembling said panels to form the fuselage element; and
bonding a layer of hyper-elastic material on inner surfaces of panels exposed to impacts after assembly.

3. The method according to claim 2, further comprising:
bonding stiffeners by co-firing or by gluing to at least one of the skin panels before assembly and that the layer of hyper-elastic material is bonded between the stiffeners after the panels are assembled.

4. An aircraft fuselage comprising a panel, said panel comprising:

a 2-4 mm thick composite skin with fiber reinforcement formed from continuous fibers, the composite skin is a carbon-epoxy resin composite with a continuous fiber volume ratio of greater or equal to 50%, one surface of said skin being exposed to impacts;

a layer formed from a hyper-elastic material formed from a chloroprene elastomer with a thickness equal to or less than the thickness of said composite skin and bonded adhesively with epoxy glue to a first surface of the composite skin, the hyper-elastic material having elongation capabilities of about 500%; and stiffeners where the layer of hyper-elastic material is bonded to the skin between said stiffeners, wherein the structural panel is resistant to operational static and fatigue stresses imposed on a second surface of the composite skin opposite the first surface, and debris striking the second surface with an incident energy of 1000 to 4000 joules will have energy dissipated by local rupture of the composite skin and no peeling off of the layer of hyper-elastic material by glue rupturing along the composite skin, and the panel is configured such that some energy of the debris is dissipated by local rupture of the composite skin, and energy absorbed by deformation of the layer of hyper-elastic material expels the debris.

* * * * *